United States Patent
Kano et al.

(10) Patent No.: US 9,755,237 B2
(45) Date of Patent: Sep. 5, 2017

(54) NEGATIVE-ELECTRODE ACTIVE MATERIAL FOR SODIUM-ION SECONDARY BATTERY, METHOD FOR MANUFACTURING SAID NEGATIVE-ELECTRODE ACTIVE MATERIAL, AND SODIUM-ION SECONDARY BATTERY

(71) Applicant: PANASONIC INTELLECTUAL PROPERTY MANAGEMENT CO., LTD., Osaka (JP)

(72) Inventors: Akira Kano, Osaka (JP); Nobuhiko Hojo, Osaka (JP); Masahisa Fujimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 160 days.

(21) Appl. No.: 14/893,027

(22) PCT Filed: May 22, 2014

(86) PCT No.: PCT/JP2014/002686
§ 371 (c)(1),
(2) Date: Nov. 20, 2015

(87) PCT Pub. No.: WO2014/188722
PCT Pub. Date: Nov. 27, 2014

(65) Prior Publication Data
US 2016/0104889 A1 Apr. 14, 2016

(30) Foreign Application Priority Data
May 22, 2013 (JP) .................................. 2013-107891
Nov. 27, 2013 (JP) .................................. 2013-244986

(51) Int. Cl.
*H01M 4/587* (2010.01)
*H01M 4/133* (2010.01)
(Continued)

(52) U.S. Cl.
CPC ............. *H01M 4/587* (2013.01); *C01B 31/00* (2013.01); *C01B 31/02* (2013.01); *H01M 4/133* (2013.01);
(Continued)

(58) Field of Classification Search
None
See application file for complete search history.

(56) References Cited

U.S. PATENT DOCUMENTS

2010/0261051 A1  10/2010  Okada et al.
2011/0135990 A1  6/2011   Yamamoto et al.
(Continued)

FOREIGN PATENT DOCUMENTS

JP  2002-008653 A  1/2002
JP  2003-187806 A  7/2003
(Continued)

OTHER PUBLICATIONS

International Search Report issued in corresponding International Patent Application No. PCT/JP2014/002698, issued on Jul. 1, 2014; with English translation.
(Continued)

*Primary Examiner* — Sarah A Slifka
(74) *Attorney, Agent, or Firm* — McDermott Will & Emery LLP

(57) ABSTRACT

A negative-electrode active material for a sodium-ion secondary battery contains a porous carbon material which has a plurality of open pores that extend through to the surface, a plurality of closed pores that do not extend through to the surface, and a solid portion made of carbon material. The
(Continued)

distance between (002) planes of carbon in at least a part of the solid portion is 0.36 nm or more. The plurality of closed pores account for a volume ratio of not less than 30% and not more than 90% with respect to a total volume of the plurality of open pores, the plurality of closed pores, and the solid portion.

21 Claims, 2 Drawing Sheets

(51) Int. Cl.
    *C01B 31/00*     (2006.01)
    *C01B 31/02*     (2006.01)
    *H01M 10/054*     (2010.01)
    *H01M 4/02*     (2006.01)

(52) U.S. Cl.
    CPC .... *H01M 10/054* (2013.01); *H01M 2004/021* (2013.01); *H01M 2004/027* (2013.01)

(56) References Cited

U.S. PATENT DOCUMENTS

| | | | |
|---|---|---|---|
| 2012/0015256 A1 | 1/2012 | Komaba et al. | |
| 2013/0288127 A1 | 10/2013 | Matsumoto et al. | |
| 2015/0162138 A1 | 6/2015 | Shodai | |

FOREIGN PATENT DOCUMENTS

| | | | |
|---|---|---|---|
| JP | 2004-095354 A | 3/2004 |
| JP | 2007-035588 A | 2/2007 |
| JP | 2009-129742 A | 6/2009 |
| JP | 2010-251283 A | 11/2010 |
| JP | 2011-519122 A | 6/2011 |
| JP | 2012-160437 A | 8/2012 |
| JP | 2012-169160 A | 9/2012 |
| JP | 5297565 B1 | 9/2013 |
| JP | 2014-036113 A | 2/2014 |
| JP | 5472514 B1 | 4/2014 |
| WO | 2009/069559 A1 | 6/2009 |
| WO | 2009/126525 A2 | 10/2009 |
| WO | 2010/013837 A1 | 2/2010 |
| WO | 2010/109889 A1 | 9/2010 |

OTHER PUBLICATIONS

International Search Report issued in corresponding International Patent Application No. PCT/JP2014/002686, issued on Jul. 1, 2014; with English translation.
Co-pending U.S. Appl. No. 14/893,029, filed Nov. 20, 2015.

NEGATIVE-ELECTRODE ACTIVE MATERIAL FOR SODIUM-ION SECONDARY BATTERY, METHOD FOR MANUFACTURING SAID NEGATIVE-ELECTRODE ACTIVE MATERIAL, AND SODIUM-ION SECONDARY BATTERY

RELATED APPLICATIONS

This application is the U.S. National Phase under 35 U.S.C. §371 of International Patent Application No. PCT/JP2014/002686, filed on May 22, 2014, which in turn claims the benefit of Japanese Application No. 2013-107891, filed on May 22, 2013 and Japanese Application No. 2013-244986, filed on Nov. 27, 2013, the disclosures of which Applications are incorporated by reference herein.

TECHNICAL FIELD

The present application relates to a negative-electrode active material for a sodium-ion secondary battery, a method of producing the same, and a sodium-ion secondary battery.

BACKGROUND ART

In recent years, there has been increasing demands for secondary batteries as power sources for transportation apparatuses such as electric vehicles, hybrid vehicles and plug-in hybrid vehicles, and also for domestic and commercial large-sized power storage devices. As such power sources, lithium-ion secondary batteries are widely used. In a lithium-ion secondary battery, lithium ions are used as a charge carrier. However, lithium is a rare metal, thus presenting the problems of expensiveness and scarce yield.

As an alternative secondary battery, sodium-ion secondary batteries are under study. In a sodium-ion secondary battery, sodium ions are used as a charge carrier. As compared to lithium, sodium is abundant and is inexpensively available, and thus is drawing attention for a secondary battery that is low-cost and is capable of being implemented in large size. However, there has been conventional wisdom that, even if a material that is deemed usable as a negative-electrode active material in a lithium-ion secondary battery (e.g., carbon materials of highly-graphitized structure, such as graphite) is straightforwardly used as a negative-electrode active material in a sodium-ion secondary battery, it is very difficult to realize a sodium-ion secondary battery having adequate performance (see Patent Document 1). Therefore, in order to realize practical applications of sodium-ion secondary batteries, positive- and negative-electrode materials, and especially a high-capacity negative-electrode material, are being desired and developed.

For example, Patent Document 1 proposes using a carbon material in amorphous glass form as a negative-electrode active material of a sodium-ion secondary battery. This is reported to provide a discharge capacity per unit weight of 265 mAh/g at the most.

On the other hand, Patent Document 2 describes use of hard carbon as a negative-electrode active material of a sodium-ion secondary battery in which an anhydrous electrolytic solution containing a certain electrolytic-solution additive is used. This is reported to provide a discharge capacity per unit weight of about 250 mAh/g at the most.

CITATION LIST

Patent Literature

[Patent Document 1] International Publication No. 2009/069559
[Patent Document 2] International Publication No. 2010/109889

SUMMARY OF INVENTION

Technical Problem

It has been desired in conventional sodium-ion secondary batteries to have a negative-electrode active material with a higher discharge capacity per unit weight.

One non-limiting, and exemplary embodiment of the present application provides: a negative-electrode active material for a sodium-ion secondary battery with an increased discharge capacity per unit weight; a method of producing the same; and a sodium-ion secondary battery incorporating the same.

Solution to Problem

A negative-electrode active material for a sodium-ion secondary battery according to one implementation of the present invention comprises a porous carbon material having a plurality of open pores that extend through to a surface, a plurality of closed pores that do not extend through to the surface, and a solid portion made of carbon material, wherein, a distance between (002) planes of carbon in at least a part of the solid portion is not less than 0.36 nm and not more than 0.41 nm; and the plurality of closed pores account for a volume ratio of not less than 30% and not more than 90% with respect to a total volume of the plurality of open pores, the plurality of closed pores, and the solid portion.

Advantageous Effects of Invention

According to one implementation of the present invention, a negative-electrode active material for a sodium-ion secondary battery with a large capacity per unit weight can be provided. Moreover, a sodium-ion secondary battery with a high capacity can be realized.

DESCRIPTION OF EMBODIMENTS

Figure 1:
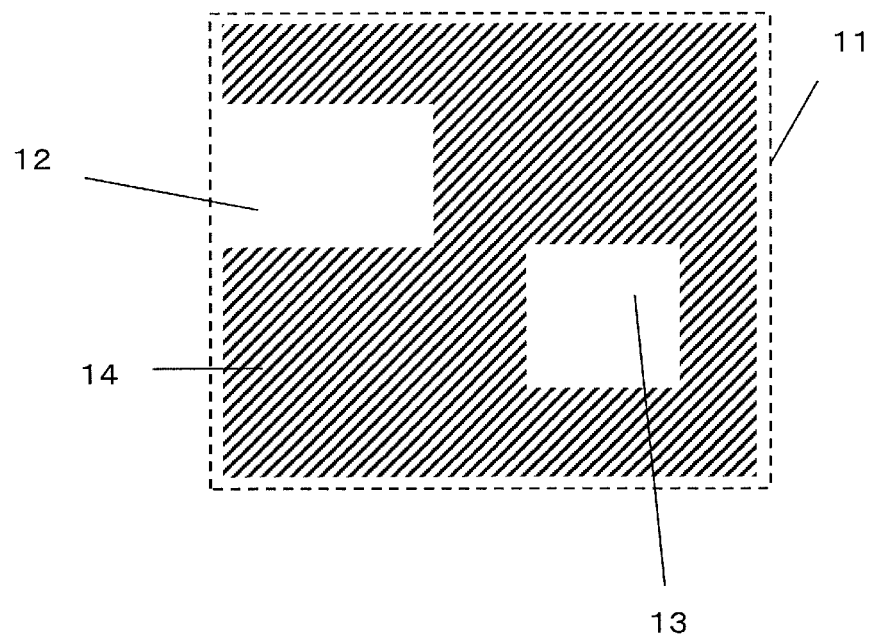
FIG. 1 A cross-sectional view showing a negative-electrode active material for a sodium-ion secondary battery according to an illustrative embodiment.

The inventors have investigated in the techniques disclosed in Patent Document 1 and Patent Document 2. Patent Documents 1 and 2 propose glassy carbon and hard carbon as negative-electrode active materials for use in sodium-ion secondary batteries (hereinafter "negative-electrode active materials for a sodium-ion secondary battery"). However, these are all carbon materials with low crystallinity, and would thus result in a smaller discharge capacity per unit weight than in the case where a carbon material with high crystallinity (e.g. graphite), which is for use as a negative-electrode active material in a lithium-ion secondary battery, is used as a negative-electrode active material in a lithium-ion secondary battery.

Although Patent Documents 1 and 2 illustrate glassy carbon and hard carbon to be usable as negative-electrode active materials in sodium-ion secondary batteries, they fail to more specifically disclose what sorts of carbon structure of glassy carbon and hard carbon affect the charge-discharge capacity of sodium ions.

The inventors have paid attention to carbon materials as negative-electrode active materials for a sodium-ion secondary battery, and conducted a structural analysis for various carbon materials and studied reactivity of such carbon materials with sodium ions. As a result, it has been found that carbon materials of specific structures exhibit greater capacities per weight than conventional, as negative-electrode active materials for a sodium-ion secondary battery. One implementation of the present invention is as follows, in outline.

A negative-electrode active material for a sodium-ion secondary battery according to one implementation of the present invention comprises a porous carbon material having a plurality of open pores that extend through to a surface, a plurality of closed pores that do not extend through to the surface, and a solid portion made of carbon material, wherein, a distance between (002) planes of carbon in at least a part of the solid portion is not less than 0.36 nm and not more than 0.41 nm; and the plurality of closed pores account for a volume ratio of not less than 30% and not more than 90% with respect to a total volume of the plurality of open pores, the plurality of closed pores, and the solid portion.

The plurality of open pores may account for a volume ratio of 7% or less with respect to a total volume of the plurality of open pores, the plurality of closed pores, and the solid portion.

The plurality of open pores may account for a volume ratio of 3% or less with respect to a total volume of the plurality of open pores, the plurality of closed pores, and the solid portion.

A sodium-ion secondary battery according to one implementation of the present invention comprises: a negative electrode containing any of the above negative-electrode active materials; a positive electrode containing a positive-electrode active material capable of occlusion and release of sodium; and an electrolyte containing sodium ions.

A method of producing a negative-electrode active material for a sodium-ion secondary battery according to one implementation of the present invention comprises: a step of providing an organic material or porous carbon material to serve as a carbon source; and a step of subjecting the organic material or porous carbon material to a heat treatment in an inert atmosphere to obtain a porous carbon material, wherein, the porous carbon material has a plurality of open pores that extend through to a surface, a plurality of closed pores that do not extend through to the surface, and a solid portion made of carbon material; a distance between (002) planes of carbon in at least a part of the solid portion is not less than 0.36 nm and not more than 0.41 nm; and the plurality of closed pores account for a volume ratio of not less than 30% and not more than 90% with respect to a total volume of the plurality of open pores, the plurality of closed pores, and the solid portion.

The organic material may be a cellulose-type resin.

The organic material may be phenolphthalein.

The porous carbon material may be an activated carbon material.

The porous carbon material may be a template carbon material.

The porous carbon material may be a template carbon material, and the step of providing an organic material or a porous carbon material to serve as the carbon source may generate the template carbon material from an organic acid metal as a start material.

The template carbon material may comprise: a step of baking an organic acid metal in an inert atmosphere at a temperature of not less than 600° C. and not more than 900° C. to obtain a bake; and a step of cleaning the bake with an acid to remove from the bake a metal composing the organic acid metal or a compound containing the metal.

The organic acid metal may be organic acid magnesium.

The heat treatment temperature may be not less than 1400° C. and not more than 2000° C.

The heat treatment temperature may be not less than 1900° C. and not more than 2300° C.

The heat treatment temperature may be 1900° C. or above.

(Embodiment 1)

Hereinafter, with reference to the drawings, an embodiment of a negative-electrode active material for a sodium-ion secondary battery according to the present invention will be described.

The negative-electrode active material for a sodium-ion secondary battery according to the present embodiment contains a porous carbon material. FIG. 1 shows a schematic structure of the porous carbon material 10. The porous carbon material 10 has a plurality of open pores 12 that extend through to a surface 11 of the porous carbon material 10, a plurality of closed pores 13 that do not extend through to the surface 11, and a solid portion 14. FIG. 1 schematically shows one open pore 12 and one closed pore 13.

The porous carbon material 10 may be of various shapes so long as it possess the aforementioned structure having the open pores 12, the closed pores 13, and the solid portion 14, and may be of various shapes that are generally usable in active materials for a sodium secondary battery. Specifically, the porous carbon material 10 may be of granular shape, flake shape, or thin film shape. In the case where the porous carbon material 10 is of granular shape, the average grain size thereof is e.g. not less than 0.01 μm and not more than 100 μm, and preferably not less than 1 μm and not more than 50 μm. When the average grain size is smaller than 1 μm, there is high surface activity, possibly resulting in a difficulty of handling. On the other hand, when it is greater than 50 μm, there is a possibility that the negative-electrode active material may have a slow rate of reaction.

Moreover, the negative-electrode active material for a sodium-ion secondary battery may mainly contain the porous carbon material, while also containing other negative-electrode active materials, additives, and the like. "Mainly" means inclusion at a rate of 50 weight % or more with respect to the whole. Preferably, the negative-electrode active material for a sodium-ion secondary battery contains the porous carbon material at a rate of 70 weight % or more with respect to the whole.

The solid portion 14 is composed of carbon material. As used herein, a carbon material may be any of various substances that mainly contain carbon alone, with a structure that is based on carbon-carbon bonds. As derived from the method of producing the carbon material, small amounts of other elements such as hydrogen and nitrogen may be contained in addition to carbon, and, within the entire carbon material, there may be a portion(s) that locally contains an element(s) other than carbon.

In the present embodiment, in the carbon material composing at least a part of the solid portion 14, the distance between (002) planes of the carbon backbone that is formed by $sp_2$ hybrid orbitals is 0.36 nm or more. Moreover, the closed pores 13 account for a volume ratio of 30% or more. As a result of this, the negative-electrode active material for a sodium-ion secondary battery according to the present embodiment has a large charge-discharge capacity per unit weight.

According to a detailed study by the inventors, in the porous carbon material, the sites which function as sites of sodium occlusion and release are considered to be the solid portion 14 and the closed pores 13 that do not extend through to the surface 11. That is: during charge, sodium becomes occluded in the interior of the solid portion 14 and the closed pores 13; and during discharge, the occluded sodium is released to the exterior.

In order for sodium to reach the interior of the closed pores 13 from the outside, it is necessary that sodium pass through the solid portion 14. Therefore, it is considered that the solid portion 14 not only functions as a site of sodium occlusion and release, but also functions as a pathway for sodium. Presumably, the sodium passing through the solid portion 14 has yet to be solvated. In order to function as a pathway for such sodium, it has been found preferable that the distance between (002) planes of the carbon backbone that is formed by $sp_2$ hybrid orbitals in the solid portion 14 is equal to or greater than 0.36 nm, and is equal to or less than 0.41 nm, which is the maximum value of distance between (002) planes in commonly-used amorphous carbon materials. It is also considered that, so long as the distance between (002) planes is 0.36 nm or more in at least a part of the solid portion 14, notwithstanding any further solid portion where the distance between (002) planes is 0.36 nm or less, sodium will selectively pass through the portion in which the distance between (002) planes is 0.36 nm or more, thereby being able to reach the interior of the closed pores 13 from the outside.

As described above, since sodium is occluded in the closed pores 13 and the solid portion 14 of the porous carbon material, any increase in their volume will result in an increase in the capacity of the porous carbon material. However, whereas the solid portion 14 will also increase the mass of the porous carbon material, the closed pores 13, which are voids, will not contribute to a mass increase even if the closed pores 13 increase. Therefore, in order to enhance the charge-discharge capacity per unit weight of the negative-electrode active material for a sodium-ion secondary battery according to the present embodiment, it is preferable that the closed pores 13 have a large volume ratio. When the closed pores 13 account for a volume ratio of 30% or more of the total volume of the open pores 12, closed pores 13, and solid portion 14, it is possible to realize a negative-electrode active material for a sodium-ion secondary battery with a greater charge-discharge capacity per unit weight. Note that, when the volume ratio of the closed pores 13 increases, the porous carbon material will increase not in mass but in volume. Therefore, when the volume ratio of the closed pores 13 has increased, there may be a discrepancy between the change in the charge-discharge capacity per unit volume and the change in the charge-discharge capacity per unit weight.

On the other hand, in a sodium secondary battery, it is considered that the open pores 12 may directly come in contact with an anhydrous electrolytic solvent to allow solvated sodium ions to be occluded therein. However, when solvated sodium ions are occluded in the open pores 12, they may cause reduction of the solvent and electrolyte to trigger an irreversible reaction; thus, it is considered that reversible occlusion and release of sodium is unlikely to occur in the open pores 12. For this reason, it is preferable that the open pores 12 are as few as possible; preferably, the open pores account for a volume ratio of 7% or less. When the open pores 12 account for a volume ratio of 7% or less, it is possible to restrain any sodium that is conducive to irreversible capacity at initial charging and discharging; thus, a negative-electrode active material can be obtained which provides a high efficiency upon initial charging and discharging. Especially when the open pores 12 account for a volume ratio of 3% or less, the irreversible capacity upon initial charging and discharging is further decreased; thus, a negative-electrode active material can be realized which provides a high incipient charge-discharge efficiency on a similar level to that provided by a graphite negative electrode of a lithium-ion secondary battery. In other words, a negative-electrode active material having a very high efficiency upon initial charging and discharging can be provided.

According to a study by the inventors, regarding each open pore 12 and each closed pore 13 there is no particular limitation as to the interior size (the size of a cross section which is perpendicular to the direction that the pore extends) and length of the pore, so long as they are sized to allow insertion of sodium atoms, and it has not been found that the charge-discharge capacity is significantly affected by these. Sodium has an atomic radius of about 0.2 nm, and in view of the fact that Na ions that have been solvated by propylene carbonate have a diameter on the order of 0.4 nm (which is a calculation result by the Stokes method), it is considered that the open pores 12 and the closed pores 13 may advantageously have a cross-sectional size (diameter) of essentially 0.4 nm or more. Moreover, the diameters of helium, argon, and nitrogen are on the order of 0.3 to 0.4 nm, and as will be described below, the aforementioned volume ratio is defined by values that are obtained through a measurement using such gases. Therefore, it is considered that a circle inscribed in a cross section which is perpendicular to the longitudinal direction of each open pore 12 and each closed pore 13 is sized 0.4 nm or larger. On the other hand, when the open pores 12 and the closed pores 13 have cross sections which are larger than several nm, it becomes possible for plural sodium atoms to exist in a cross section of each closed pore 13. In actuality, however, it is considered that repulsion between sodium atoms, etc., makes it unlikely for sodium to be occluded in the closed pores 13 in such a manner that the sodium atoms exist in a cross section of each closed pore 13 with a high density. Therefore, in terms of effective space utility of the closed pores 13, it is considered preferable that a circle inscribed in a cross section which is perpendicular to the longitudinal direction of each closed pore 13 is sized essentially 100 nm or smaller. Also, use of the aforementioned gases will allow for precise measurement of the volume of pores with diameters which are essentially 100 nm or less.

Thus, in the negative-electrode active material for a sodium-ion secondary battery according to the present embodiment, in the carbon material composing at least a part of the solid portion 14 of the porous carbon material, the distance between (002) planes of the carbon backbone that is formed by $sp_2$ hybrid orbitals is 0.36 nm or more. As a result, sodium is allowed to reach the interior of the solid portion 14 and the closed pores 13 via the solid portion 14, thus becoming occluded. Moreover, occluded sodium is released in a reversible manner. Thus, a negative-electrode active material is realized which is capable of reversible occlusion and release of sodium.

Moreover, the closed pores 13 can contribute to an increased charge-discharge capacity without increasing the mass of the active material. When the closed pores 13 account for a volume ratio of 30% or more of the total volume of the open pores 12, closed pores 13, and solid portion 14, a negative-electrode active material for a sodium-ion secondary battery is realized which provides a greater charge-discharge capacity per unit weight than conventional.

The distance between (002) planes in the porous carbon material that is contained in the negative-electrode active material for a sodium-ion secondary battery according to the present embodiment can be determined through X-ray diffractometry. A specific example of the measurement procedure will now be described in the order of sample adjustment, measurement, and analysis. During the sample adjustment, a porous carbon material is dried for 2 hours in a vacuum at 120° C., for example. Next, standard Si (NIST 640d) is weighed to 10 weight % with respect to the porous carbon material, and the dried porous carbon material and the standard Si are mixed in a mortar. Thus, a specimen for X-ray diffractometry is prepared. For the measurement, the Cu-Kα lines can be used as an X-ray source, for example. X rays are generated with an output power defined by a tube voltage of 40 kV and a tube current of 40 mA, and the specimen is scanned by a 2θ/θ method in a range from 20° to 30° (2θ), and diffraction lines are detected.

In the analysis, the measurement results are corrected according to a method which is described in JIS R7651 by using the peak position(s) of standard Si (111), and based on the resultant corrected value, the distance between (002) planes of the carbon backbone structure is determined by using Bragg's equation ($d_{002}=\lambda/\sin \theta_c/2$), from the carbon (002) peak value (2θ) which is observed near approximately 23° to 26°. In the case of the Cu-Kα lines, $\lambda=0.15419$ nm.

Depending on the porous carbon material, only a portion of the solid portion may become graphitized through a heat treatment, etc., which is conducted during production of the porous carbon material, whereby two or more (002) peaks of carbon may be observed near 23° to 26°. The sharp peak to be observed near 26° is a peak that is ascribable to the locally-graphitized solid portion, whereas the broad peak to be observed at the lowermost angle side is a peak that is ascribable to a solid portion of lower crystallinity. For a sodium pathway to function, it is preferable that the distance between (002) planes of the carbon backbone structure is 0.36 nm or more; as for any carbon material that exhibits two or more (002) peaks of carbon, the broad peak to be observed at the lowermost angle side may be regarded as the (002) peak of carbon, so that the distance between (002) planes can be determined from the peak value (2θ) thereof.

Moreover, in the carbon material contained in the negative-electrode active material for a sodium-ion secondary battery according to the present embodiment, a volume ratio of the closed pores (which hereinafter may simply be referred to as the closed pore ratio) can be determined as follows. First, the volume $V_{OP}$(cc/g) of the open pores 12 per unit weight of the carbon material is determined through gas adsorption measurement. The volume of the solid portion 14 and the closed pores 13 of the porous carbon material can be determined as an inverse of an apparent density $d_{He}$ (g/cc) of the porous carbon material, through density measurement.

The volume ratio $R_{CP}$ (%) of the closed pores can be determined according to the following equation.

$$R_{CP} (\%)=(1/d_{He}-1/2.26)/(V_{OP}+1/d_{He})\times 100$$

Herein, the denominator of the above equation, i.e., ($V_{OP}+1/d_{He}$), is a sum volume of the open pores 12, closed pores 13, and solid portion 14 per gram of carbon material. The numerator ($1/d_{He}\times 1/2.26$), which is indicative of the volume of the closed pores 13, is a value resulting by subtracting the volume of the solid portion (1/2.26)) from the sum volume of the solid portion 14 and the closed pores 13 per gram of porous carbon material. By dividing the numerator with the denominator, and converting the resultant value into percentage, a volume ratio $R_{cp}$ (%) of the closed pores in the carbon material is obtained. The volume (1/2.26) of the solid portion 14 is calculated from the true density 2.26 g/cc of carbon.

An example of a specific measurement method of the volume ratio $R_{cp}$ (%) of the closed pores is as follows. For example, by using a carbon material which has been subjected to a pretreatment of being dried for 2 hours at 120° C. in a vacuum and using an argon or nitrogen gas as an adsorption gas species, the volume $V_{OP}$ (cc/g) of the open pores 12 per unit weight of the carbon material can be determined from an amount of adsorbed gas at a relative pressure 0.99 with an automatic gas adsorption quantifier. While the automatic gas adsorption quantifier is used as an apparatus for measuring the total pore volume (cc/g), gas will not be adsorbed to the closed pores in this measurement; therefore, it means that the volume $V_{OP}$ (cc/g) of the open pores 12 per unit weight is being measured.

By using a carbon material which has been subjected to a pretreatment of being dried for 2 hours at 120° C. in a vacuum and using helium as the measurement gas, an apparent density (g/cc) of the carbon material can be determined with an ultrapycnometer.

Moreover, a volume ratio of the open pores in the carbon material (which hereinafter may simply be referred to as the open pore ratio) $R_{OP}$ can be calculated from the following equation, using $V_{OP}$ and $d_{He}$.

$$R_{OP} (\%)=V_{OP}/(V_{OP}+1/d_{He})\times 100$$

The carbon material contained in the negative-electrode active material for a sodium-ion secondary battery according to the present embodiment can be obtained by baking an organic material or a porous carbon material to serve as a carbon source in an inert atmosphere, for example. As the organic material to serve as a carbon source, cellulose-type resins and phenolphthalein are preferable. The cellulose-type resin and phenolphthalein may be in fiber, grain, or other shapes. In terms of processing to be performed for the active material grains after being baked, a cellulose-type resin or phenolphthalein of granular or linter shapes that are sized several μm to several dozen μm is preferable. As inexpensive cellulose-type materials, charcoal, sawdust, paper, and the like are usable. The heat treatment temperature is preferably 1400° C. to 2000° C. Although there is no particular limitation to the baking atmosphere so long as it is inert, gases such as nitrogen, argon, helium, and neon are suitably used. Through a heat treatment, elements other than carbon will be evaporated from the raw material used as the carbon source to promote carbonization of the raw material, and also the open pores will become clogged, thus being converted into closed pores.

In the case where the porous carbon material needs to be pulverized for granulation or the like, it is preferable to pulverize the organic material or porous carbon material before being subjected to a heat treatment. When a porous carbon material which is obtained through a heat treatment is pulverized, the structure of the porous carbon material may possibly change, converting the closed pores into open pores.

Preferable porous carbon materials are activated carbon materials and template carbon materials. The activated carbon material may be in fiber, grain, or other shapes. In terms of processing to be performed for the active material grains after being baked, it is desirably an activated carbon material of granular or linter shapes that are sized several μm to several dozen μm. As an inexpensive activated carbon material, steam activated carbon is usable. The heat treatment temperature is preferably 1900° C. to 2300° C. Although there is no particular limitation to the baking atmosphere so long as it is inert, gases such as nitrogen, argon, helium, and neon are suitably used. Generally, activated carbon materials have open pores and hardly any closed pores. Through the above bake, the open pores can be clogged and converted into closed pores.

The template carbon material may be in fiber, grain, or other shapes. In terms of processing to be performed for the active material grains after being baked, it is desirably a template carbon material of granular or linter shapes that are sized several μm to several dozen μm. Generally, a template carbon material is a porous carbon material which has been synthesized based on inorganic matter or organic matter as a template. As the start material, an organic acid metal, a mixture of two or more organic acid metals, a mixture of two or more organic materials, a mixture of an organic material and a metal oxide, or the like can be used. An inexpensive start substance for the template carbon material is an organic acid metal.

In order to more efficiently remove the template component and increase the volume ratio of pores, the template carbon material may be produced by baking a start material at not less than 600° C. and not more than 900° C. in an inert atmosphere, followed by an acid wash treatment. By baking the start material in the aforementioned temperature range, a template which is composed of an organic compound, a metal, or a metal-containing compound is formed, resulting in a bake such that spaces in the template are filled with the carbon material. By cleaning the bake with an acid and eluting the template, a template carbon material having open pores is generated. From the standpoint of ease of handling, organic acid magnesium can be suitably used as an organic acid metal. As inexpensive organic acid magnesium, magnesium gluconate, magnesium citrate, magnesium acetate, magnesium malate, magnesium glutamate, magnesium benzoate, magnesium stearate, and the like can be used. The heat treatment temperature is preferably 1900° C. or above. Although there is no particular limitation to the baking atmosphere so long as it is inert, gases such as nitrogen, argon, helium, and neon are suitably used. Generally, template carbon materials have open pores and hardly any closed pores. Through the above bake, the open pores can be clogged and converted into closed pores.

The distance between (002) planes of the carbon and the volume ratio of the closed pores can be adjusted through selection of the raw material to be used as the carbon source and the heat treatment temperature. According to a study by the inventors, as the heat treatment temperature increases, the volume ratio of the closed pores increases, but also the distance between (002) planes decreases. Therefore, a raw material to be used as the carbon source and the heat treatment temperature are preferably selected so that the closed pores attain a high volume ratio within a range where the distance between (002) planes remains 0.36 nm or more.

(Embodiment 2)

Figure 2:
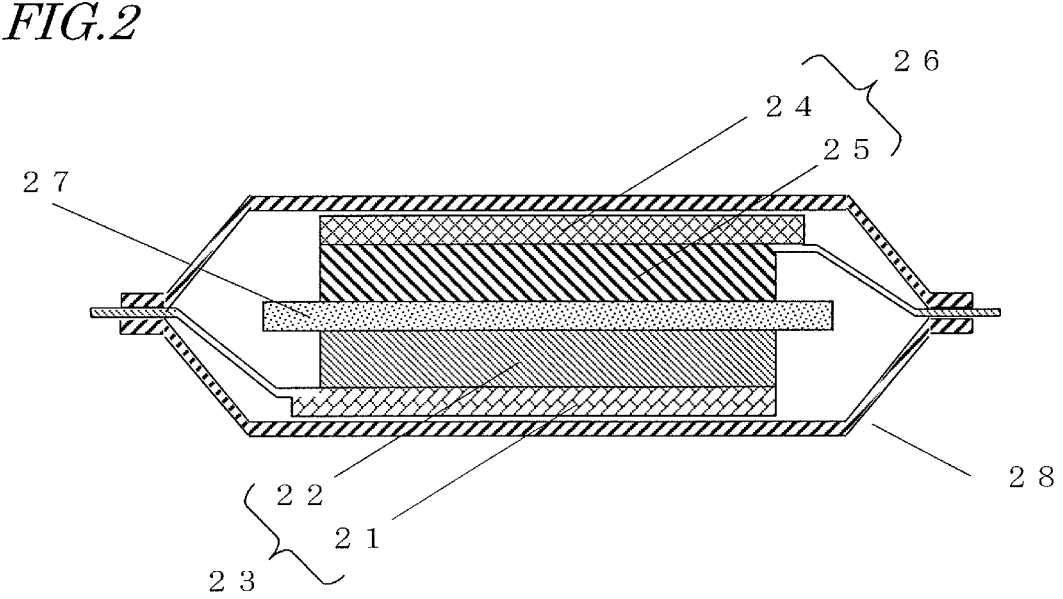
FIG. 2 A cross-sectional view showing a sodium-ion secondary battery according to an illustrative embodiment.

An embodiment of a sodium-ion secondary battery according to the present invention will be described. FIG. 2 is a schematic cross-sectional view illustrating a construction for a sodium-ion secondary battery of the present embodiment. The sodium-ion secondary battery includes a positive electrode 23, a negative electrode 26, and a separator 27 and an electrolyte which are interposed between the positive electrode 23 and the negative electrode 26.

In the example shown in FIG. 2, the positive electrode 23 includes a positive-electrode current collector 21 and a positive-electrode mixture layer 22 formed on the positive-electrode current collector 21, the positive-electrode mixture layer 22 containing a positive-electrode active material. The negative electrode 26 includes a negative-electrode current collector 24 and a negative-electrode mixture layer 25 formed on the negative-electrode current collector 24, the negative-electrode mixture layer 25 containing a negative-electrode active material. The positive electrode 23 and the negative electrode 26 are disposed so that the positive-electrode mixture layer 22 and the negative-electrode mixture layer 25 oppose each other via the separator 27, thus constituting an electrode group. The electrode group is covered with a sheath 28.

The negative-electrode mixture layer 25 contains the negative-electrode active material for a sodium-ion secondary battery which has been described in Embodiment 1. As necessary, the negative-electrode mixture layer 25 may contain a conductivity aid, an ion conductor and/or a binder in addition to the negative-electrode active material. In the case where no conductivity aid, ion conductor, or binder is contained, the negative-electrode active material may be a thin film which is formed on the negative-electrode current collector 24.

As has been described in Embodiment 1, the negative-electrode active material contains a porous carbon material having open pores 12 that extend through to the surface, closed pores 13 that do not extend through to the surface, and a solid portion 14. In at least a part of the solid portion, the distance between (002) planes of the carbon is 0.36 nm or more. Moreover, the closed pores 13 account for a volume ratio of not less than 30% and not more than 90%. As will be seen from the Examples set forth below, a negative-electrode active material containing such a porous carbon material has a higher per unit weight capacity than those of conventional negative-electrode active materials for a sodium-ion secondary battery. Therefore, according to the present embodiment, it is possible to realize a sodium-ion secondary battery which has a lighter weight and higher capacity than conventional.

The conductivity aid and the ion conductor are to be used in order to reduce electrode resistance. Examples of conductivity aids include: carbon materials such as carbon black, graphite, and acetylene black (carbon conductivity aid); and electrically-conductive polymer compounds such as polyaniline, polypyrrole, and polythiophene. Examples of ion conductors include: gel electrolytes such as polymethyl methacrylate and polymethyl methacrylate; and solid electrolytes such as polyethylene oxide.

The binder is to be used in order to improve the bindability of the material composing the electrode. Specific examples include polyvinylidene fluoride, vinylidene fluoride-hexafluoropropylene copolymers, vinylidene fluoride-tetrafluoroethylene copolymers, polytetrafluoroethylene, carboxymethyl cellulose, polyacrylic acid, styrene-butadiene rubber, polypropylene, polyethylene, and polyimide.

As the negative-electrode current collector 24, a porous or nonporous sheet or film which is made of a metal material, e.g., aluminum, stainless steel, nickel, copper, or an alloy thereof, can be used. Aluminum and alloys thereof provide the advantages of inexpensiveness and easiness of being formed into a thin film. As the sheet or film, a metal foil, a mesh, or the like is used. For the purposes of reducing the resistance value, providing a catalytic effect, and enhancing the bond between the negative-electrode mixture layer 25 and the negative-electrode current collector 24 through allowing the negative-electrode mixture layer 25 and the negative-electrode current collector 24 to be chemically or physically bonded, a carbon material such as carbon may be applied as a conductivity aid onto the surface of the negative-electrode current collector 24.

The positive-electrode mixture layer 22 contains a positive-electrode active material which is capable of occlusion and release of sodium ions. As necessary, the positive-electrode mixture layer 22 may contain a conductivity aid, an ion conductor and/or a binder in addition to the positive-electrode active material.

The positive-electrode active material is not particularly limited so long as it is a material which occludes and releases sodium ions, and may be, for example, sodium-containing transition metal oxides, transition-metal fluorides, polyanion and fluorinated polyanion materials, or transition-metal sulfides. Specifically, as a sodium-containing transition metal oxide, $Na_xMe^1_yO_2$ ($0<x\leq1$; $0.95\leq y<1.05$; $Me_1$ includes at least one selected from the group consisting of Fe, Mn, Ni, Co, Cr, and Ti) and the like can be used. As a transition-metal fluoride, $NaFeF_3$, $NaMnF_3$, $NaNiF_3$, and the like can be used. As polyanion or a fluorinated polyanion material, $NaMe^2PO_4$, $Na_3Me^2{}_2(PO_4)_3$, $Na_4Me^2{}_3(PO_4)_2P_2O_7$, $Na_2Me^2PO_4F$, $Na_3Me^2{}_2(PO_4)_2F_3$ (where $Me^2$ includes at least one selected from the group consisting of Fe, Mn, Ni, Co, Ti, V, and Mo), and the like can be used. As a transition-metal sulfide, $Ni_3S_2$, $FeS_2$, $TiS_2$, and the like can be used. Among others, use of a Na-containing transition metal oxide provides the advantage of low production cost and high average discharge voltage. As for the conductivity aid, ion conductor, and binder, what is similar to those for the negative-electrode mixture layer 15 can be used.

As the positive-electrode current collector 21, a porous or nonporous sheet or film which is made of a metal material, e.g., aluminum, stainless steel, titanium, or an alloy thereof, can be used. Aluminum and alloys thereof provide the advantages of inexpensiveness and easiness of being formed into a thin film, and so on. As the sheet or film, a metal foil, a mesh, or the like is used. For the purposes of reducing the resistance value, providing a catalytic effect, and enhancing the bond between the positive-electrode mixture layer 22 and the positive-electrode current collector 21 through allowing the positive-electrode mixture layer 22 and the positive-electrode current collector 21 to be chemically or physically bonded, a carbon material such as carbon may be applied as a conductivity aid onto the surface of the positive-electrode current collector 21.

As the separator 27, a porous film of polyethylene, polypropylene, glass, cellulose, ceramics, or the like is used, as being impregnated with an electrolyte in its pores.

Examples of anhydrous electrolytes to be used for a battery include an anhydrous solvent, a gel electrolyte, or a solid electrolyte containing a sodium salt.

As species of the sodium salt, sodium phosphate hexafluoride ($NaPF_6$), sodium borate tetrafluoride ($NaBF_4$), sodium perchlorate ($NaClO_4$), sodium bis(trifluoromethylsulfonyl)imide ($NaN(SO_2CF_3)_2$), sodium bis(perfluoroethylsulfonyl)imide ($NaN(SO_2C_2F_5)_2$), sodium bis(fluoromethylsulfonyl)imide ($NaN(SO_2F)_2$), $NaAsF_6$, $NaCF_3SO_3$, sodium difluoro(oxalato)borate, and the like can be used. From the standpoints of safety, thermostability, and ion conductivity of the battery, $NaPF_6$ is suitably used. It is applicable to use one of the aforementioned electrolyte salts, or two or more of them in combination.

Examples of anhydrous solvents include cyclic carbonic acid esters, acyclic carbonic acid esters, esters, cyclic ethers, acyclic ethers, nitriles, and amides for use as anhydrous solvents for usual batteries. It is applicable to use one of these solvents alone, or two or more of them in combination.

Examples of cyclic carbonic acid esters include ethylene carbonate, propylene carbonate, and butylene carbonate; some or all hydrogen groups therein may be fluorinated, e.g., trifluoropropylene carbonate or fluoroethyl carbonate.

Examples of acyclic carbonic acid esters include dimethyl carbonate, ethylmethyl carbonate, diethyl carbonate, methylpropyl carbonate, and ethylpropyl carbonate, methylisopropyl carbonate. Some or all hydrogen groups therein may be fluorinated.

Examples of esters include methyl acetate, ethyl acetate, propyl acetate, methyl propionate, ethyl propionate, and γ-butyrolactone. Examples of cyclic ethers include 1,3-dioxolane, 4-methyl-1,3-dioxolane, tetrahydrofuran, 2-methyltetrahydrofuran, propyleneoxide, 1,2-butylene oxide, 1,4-dioxane, 1,3,5-trioxane, furan, 2-methylfuran, 1,8-cineole, and crown ether.

Examples of acyclic ethers include 1,2-dimethoxy ethane, diethyl ether, dipropyl ether, diisopropyl ether, dibutyl ether, dihexyl ether, ethylvinyl ether, butylvinyl ether, methylphenyl ether, ethylphenyl ether, butylphenyl ether, pentylphenyl ether, methoxy toluene, benzylethyl ether, diphenyl ether, dibenzyl ether, o-dimethoxy benzene, 1,2-diethoxy ethane, 1,2-dibutoxy ethane, diethyleneglycol dimethylether, diethyleneglycol diethylether, diethyleneglycol dibutyl ether, 1,1-dimethoxy methane, 1,1-diethoxy ethane, triethylene glycol dimethyl ether, and tetraethylene glycol dimethyl ether.

Examples of nitriles include acetonitrile. Examples of amides include dimethylformamide.

EXAMPLES AND COMPARATIVE EXAMPLES

As Examples and Comparative Examples, evaluation cells in which the negative-electrode active material was used as a test electrode and a sodium metal was used as a counter electrode were produced, and their characteristics were measured. Hereinafter, methods of producing the evaluation cell and the results of characteristics measurement will be described. The Examples presented below are only exemplary; embodiments of the present invention are not limited to the Examples below.

1. Production of Cell

Example 1

Production of the Negative-electrode Active Material

A porous carbon material to become the negative-electrode active material was produced through the three steps of a carbonization step, a classification step, and a heat treatment step as below.

First, the carbonization step is described. α-cellulose (quantitative filter paper manufactured by Whatman (No.

40)) was used as a carbon source, which was heated at a rate of 10° C. per minute up from room temperature in a circular furnace (Ar gas flow rate: 1 L/min) under an Ar atmosphere, until reaching 1000° C., and then maintained at 1000° C. for 1 hour. Thereafter, heating was stopped, and after natural cooling, a carbide was taken out of the tube furnace.

Next, the classification step is described. The carbide obtained through the above carbonization step was pulverized in an agate mortar, and classified by using a standard sieve of SUS with an opening of 40 μm, whereby carbon powder was obtained.

Lastly, the heat treatment step is described. The above carbon powder was heated at a rate of 10° C. per minute up from room temperature in a tube furnace under an Ar atmosphere (Ar gas flow rate: 1 L/min), until reaching 1500° C., and then maintained at 1500° C. for 1 hour. Thereafter, heating was stopped, and after natural cooling, a carbon material was taken out of the tube furnace, whereby a negative-electrode active material made of a porous carbon material was obtained.

Production of the Sodium Secondary Battery

By using the carbon material produced by the above method as a negative-electrode active material, and using a copper foil as a current collector, a test electrode was produced. The above porous carbon material as the negative-electrode active material and polyvinylidene fluoride as a binder were weighed to a ratio by weight of 9:1, and dispersed in an NMP solvent to obtain a slurry. By using a coater, a copper foil was coated with the resultant slurry. The coated plate was rolled with a roller, punched into a square shape with each side measuring 20 mm, and processed into an electrode shape, thus obtaining a test electrode.

Then, using the above test electrode, a sodium secondary battery (evaluation cell) having a counter electrode of a sodium metal was produced.

Blending of the electrolytic solution and production of the evaluation cell were conducted in a glove box under an Ar atmosphere with a dew point of −60 degrees or below and an oxygen value of 1 ppm or less. The electrolytic solution contained 1 molarity of sodium phosphate hexafluoride ($NaPF_6$) being dissolved in a solvent in which ethylene carbonate and diethyl carbonate were mixed at a volume ratio of 1:1. Moreover, a piece of sodium metal was crimped onto a nickel mesh having a square shape with each side measuring 20 mm, thus obtaining a counter electrode.

The above test electrode and counter electrode were housed in a sheath so that they opposed each other via a separator of a polyethylene microporous film impregnated with the electrolytic solution, and the sheath was sealed, thus obtaining an evaluation cell.

Example 2

Except for a different temperature of the heat treatment step for the carbon material, otherwise the same method as that of Example 1 was used to produce a negative-electrode active material, and an evaluation cell was produced by the same method as that of Example 1. The heat treatment temperature was 1400° C.

Example 3

Except for a different temperature of the heat treatment step for the carbon material, otherwise the same method as that of Example 1 was used to produce a negative-electrode active material, and an evaluation cell was produced by the same method as that of Example 1. The heat treatment temperature was 1600° C.

Example 4

Except for a different carbon source and a different temperature of the heat treatment step for the carbon material, otherwise the same method as that of Example 1 was used to produce a negative-electrode active material, and an evaluation cell was produced by the same method as that of Example 1. As the carbon source, an activated carbon material (specific surface: 2300 $m^2$/g; average grain size: 2.9 μm) was used; and the heat treatment temperature was 2100° C.

Example 5

Except for a different carbon source and a different temperature of the heat treatment step for the carbon material, otherwise the same method as that of Example 1 was used to produce a negative-electrode active material, and an evaluation cell was produced by the same method as that of Example 1. As the carbon source, an activated carbon material (specific surface: 1900 $m^2$/g; average grain size: 20 μm) was used; and the heat treatment temperature was 2100° C.

Example 6

Except for a different carbon source and a different temperature of the heat treatment step for the carbon material, otherwise the same method as that of Example 1 was used to produce a negative-electrode active material, and an evaluation cell was produced by the same method as that of Example 1. As the carbon source, phenolphthalein (manufactured by Wako Pure Chemical Industries, Ltd.) was used; and the heat treatment temperature was 1400° C.

Example 7

Except for a different temperature of the heat treatment step for the carbon material, otherwise the same method as that of Example 6 was used to produce a negative-electrode active material, and an evaluation cell was produced by the same method as that of Example 6. The heat treatment temperature was 1600° C.

Example 8

Except for a different temperature of the heat treatment step for the carbon material, otherwise the same method as that of Example 6 was used to produce a negative-electrode active material, and an evaluation cell was produced by the same method as that of Example 6. The heat treatment temperature was 1800° C.

Example 9

Except for a different carbon source, a different carbonization step, and a different temperature of the heat treatment step for the carbon material, otherwise the same method as that of Example 1 was used to produce a negative-electrode active material, and an evaluation cell was produced by the same method as that of Example 1. As the carbon source, magnesium gluconate (manufactured by Tokyo Chemical Industry Co., Ltd.) was heated at a rate of 10° C. per minute up from room temperature in a tube furnace under an Ar atmosphere (Ar gas flow rate: 1 L/min), until reaching 900° C., and then maintained at 900° C. for 1 hour. Thereafter, heating was stopped, and after natural cooling, a carbide was taken out of the tube furnace. Next, agitation and cleaning with hydrochloric acid was performed to remove magnesium oxide. The heat treatment temperature was 2100° C.

Example 10

Except for a different temperature of the heat treatment step for the carbon material, otherwise the same method as that of Example 9 was used to produce a negative-electrode active material, and an evaluation cell was produced by the same method as that of Example 9. The heat treatment temperature was 2400° C.

Comparative Example 1

Except that a hard carbon carbon material (Carbotron P, manufactured by Kureha Battery Materials Japan Co., Ltd.) was used as the negative-electrode active material, otherwise the same method as that of Example 1 was used to produce an evaluation cell.

Comparative Example 2

Except for a different temperature of the heat treatment step for the carbon material, otherwise the same method as that of Example 1 was used to produce a negative-electrode active material, and an evaluation cell was produced by the same method as that of Example 1. The heat treatment temperature was 2100° C.

Comparative Example 3

Except for a different temperature of the heat treatment step for the carbon material, otherwise the same method as that of Example 1 was used to produce a negative-electrode active material, and an evaluation cell was produced by the same method as that of Example 1. The heat treatment temperature was 2400° C.

Comparative Example 4

Except that a soft carbon carbon material (1200° C. baked coal pitch coke) was used as the negative-electrode active material, otherwise the same method as that of Example 1 was used to produce an evaluation cell.

Comparative Example 5

Except that an activated carbon material (specific surface: 2300 m²/g; average grain size: 2.9 μm) was used as the negative-electrode active material, otherwise the same method as that of Example 1 was used to produce an evaluation cell.

Comparative Example 6

Except that an activated carbon material (specific surface: 1900 m²/g; average grain size: 20 μm) was used as the negative-electrode active material, otherwise the same method as that of Example 1 was used to produce an evaluation cell.

Comparative Example 7

Except for a different temperature of the heat treatment step for the carbon material, otherwise the same method as that of Example 5 was used to produce a negative-electrode active material, and an evaluation cell was produced by the same method as that of Example 5. The heat treatment temperature was 1800° C.

Comparative Example 8

Except for a different temperature of the heat treatment step for the carbon material, otherwise the same method as that of Example 5 was used to produce a negative-electrode active material, and an evaluation cell was produced by the same method as that of Example 5. The heat treatment temperature was 2400° C.

Comparative Example 9

Except for a different temperature of the heat treatment step for the carbon material, otherwise the same method as that of Example 6 was used to produce a negative-electrode active material, and an evaluation cell was produced by the same method as that of Example 6. The heat treatment temperature was 2100° C.

Comparative Example 10

Except for a different temperature of the heat treatment step for the carbon material, otherwise the same method as that of Example 9 was used to produce a negative-electrode active material, and an evaluation cell was produced by the same method as that of Example 9. The heat treatment temperature was 1000° C.

Comparative Example 11

Except for a different temperature of the heat treatment step for the carbon material, otherwise the same method as that of Example 9 was used to produce a negative-electrode active material, and an evaluation cell was produced by the same method as that of Example 9. The heat treatment temperature was 1800° C.

Comparative Example 12

Except that a carbon black carbon material (Ketjenblack, manufactured by Lion Corporation) was used as the negative-electrode active material, otherwise the same method as that of Example 1 was used to produce an evaluation cell.

2. Characteristics Evaluation (A) Measurement of the Open Pore Ratio, the Closed Pore Ratio, and the Interlayer Distance of the Porous Carbon Material The open pore ratio, the closed pore ratio, and the interphase distance of the porous carbon materials of Examples 1 to 10 and Comparative Examples 1 to 12 were measured. The open pore ratio and the closed pore ratio were measured through the following procedure.

With an automatic gas adsorption quantifier (AS1-MP-9 manufactured by Quantachrome Instruments), a gas adsorption measurement for the porous carbon material was carried out by using argon, and a total pore volume $V_{OP}$ (cc/g) of the porous carbon material was determined from the amount of adsorbed gas at a relative pressure of 0.99.

With an ultrapycnometer (Ultrapic1200e manufactured by Quantachrome Instruments), an apparent density $d_{He}$ of the porous carbon material was determined by using helium as a measurement gas.

Moreover, from the $V_{OP}$ and $d_{He}$ as determined from the results of the gas adsorption measurement and density measurement, a ratio between the open pore ratio and the closed pore of the negative-electrode active material was determined according to the following equation.

open pore ratio $R_{OP}$ (%)=100×$V_{OP}$/($V_{OP}$+1/$d_{He}$)

closed pore ratio $R_{CP}$ (%)=100×(1/$d_{He}$−1/2.26)/ ($V_{OP}$+1/$d_{He}$)

The inter-plane distance of the porous carbon material was measured by the following procedure. Ten mass % of standard Si (NIST 640d) with respect to the porous carbon material was taken, and sufficiently mixed in a mortar, which served as a specimen for X-ray diffractometry. As an X-ray diffractometry apparatus, RINT2000 manufactured by Rigaku Corporation was used. As the X-ray source, the Cu-Kα lines were used, and measurements were taken through scanning across 20° to 30° (2θ) by the 2θ/θ method, with a measurement output defined by a tube voltage of 40 kV and a tube current of 40 mA. A carbon (002) peak near 23° to 26° was corrected with a peak position of standard Si (111), and a distance between (002) planes of the solid portion was determined from Bragg's equation (d=λ/sin $θ_c$/2).

(B) Method of the Charge-discharge Test for the Negative-electrode Active Material The evaluation cells of Examples 1 to 10 and Comparative Examples 1 to 12 were subjected to a charge-discharge test to evaluate their charge-discharge characteristics. The method and results will be described.

The charge-discharge test for the evaluation cells was conducted in a thermostatic bath at 25° C. In the charge-discharge test, the test electrode containing the negative-electrode active material was charged, and after a pause of 20 minutes, it was discharged. The charging and discharging were performed with a constant current, with a current value corresponding to 0.05 mA per unit area of the negative electrode. The end of charge was defined as a point in time at which the voltage reached 0 V (charge end voltage: 0 V). The end of discharge was defined as a point in time at which the voltage reached 2.0 V (discharge end voltage: 2.0 V). An initial discharge capacity (mAh/g) was calculated as a value of the initial discharge capacity as divided per weight of the negative-electrode active material, and an initial charge-discharge efficiency (%) was calculated as a value resulting from dividing the initial discharge capacity with the initial charge capacity.

The results of the charge-discharge test of the evaluation cells of Examples 1 to 10 and Comparative Examples 1 to 12 are shown in Table 1, together with the closed pore ratio, the open pore ratio, and the inter-plane distance of the negative-electrode active material.

In the carbon materials of Example 4, Example 5, Example 9, and Example 10, and Comparative Example 2, Comparative Example 3, Comparative Example 8, and Comparative Example 9 shown in Table 1, two or more carbon (002) peaks appeared in X-ray diffractometry across 20° to 30°; however, by regarding the broad peak observed at the lowermost angle side as the carbon (002) peak, a distance between (002) planes of the solid portion was determined from that peak value (2θ). In the carbon materials of Comparative Example 5 and Comparative Example 6, no d(002) peak was observed in the X-ray diffractometry across 20° to 30°; therefore, the distance between (002) planes of the solid portion is indicated as "-", meaning unmeasurable.

TABLE 1

| | carbon material structure | | | charge-discharge test | |
|---|---|---|---|---|---|
| | open pore ratio % | closed pore ratio % | inter-plane distance nm | initial discharge capacity mAh/g | initial charge-discharge efficiency % |
| Example 1 | 2.4 | 35.8 | 0.383 | 288 | 93 |
| Example 2 | 2.6 | 30.9 | 0.372 | 270 | 92 |
| Example 3 | 2.6 | 34.5 | 0.370 | 274 | 92 |
| Example 4 | 17.4 | 32.8 | 0.364 | 359 | 83 |
| Example 5 | 6.1 | 42.7 | 0.364 | 413 | 90 |
| Example 6 | 1.4 | 30.8 | 0.382 | 266 | 93 |
| Example 7 | 2.5 | 36.8 | 0.366 | 301 | 92 |
| Example 8 | 2.1 | 38.8 | 0.360 | 269 | 92 |
| Example 9 | 1.3 | 43.0 | 0.362 | 420 | 92 |
| Example 10 | 1.0 | 52.5 | 0.360 | 438 | 93 |
| Comparative Example 1 | 2.4 | 11.0 | 0.379 | 223 | 84 |
| Comparative Example 2 | 2.9 | 36.2 | 0.354 | 237 | 88 |
| Comparative Example 3 | 2.8 | 34.1 | 0.350 | 230 | 87 |
| Comparative Example 4 | 4.1 | 14.7 | 0.354 | 74 | 45 |
| Comparative Example 5 | 80.2 | 0.1 | — | 77 | 14 |
| Comparative Example 6 | 65.9 | 1.9 | — | 105 | 20 |
| Comparative Example 7 | 10.9 | 15.8 | 0.373 | 231 | 68 |
| Comparative Example 8 | 6.0 | 41.9 | 0.357 | 186 | 81 |
| Comparative Example 9 | 2.3 | 37.8 | 0.352 | 243 | 89 |
| Comparative Example 10 | 59.6 | 4.5 | 0.383 | 62 | 24 |
| Comparative Example 11 | 24.2 | 8.7 | 0.369 | 228 | 58 |
| Comparative Example 12 | 89.6 | 1.2 | 0.365 | 148 | 16 |

3. Discussion

In all of Examples 1 to 10 and Comparative Examples 1 to 12, a porous carbon material is used as the negative-electrode active material. However, the results shown in Table 1 indicate that these negative-electrode active materials greatly differ in their discharge capacity depending on the structure of the porous carbon material.

The negative-electrode active material of Example 5, which has a closed pore ratio of 42.7% and contains a large number of sites (closed pores) functioning as sites of sodium occlusion and release, exhibits a discharge capacity per weight as large as 413 mAh/g. However, the negative-electrode active material of Comparative Example 8, which has a closed pore ratio of 41.9% and contains a similar number of closed pores to those in Example 5, exhibits an initial discharge capacity as small as 186 mAh/g. These results are considered to indicate that, since the distance between (002) planes of the solid portion of the negative-electrode active material of Comparative Example 8 is as small as 0.357 nm, the solid portion does not sufficiently function as a pathway for sodium to reach the interior of the closed pores from the outside and thus sodium cannot adequately reach the interior of the closed pores, thus resulting in the small discharge capacity per weight in spite of the large number of closed pores contained. It is learned from these results that the distance between (002) planes of the solid portion needs to be 0.36 nm or more in order to obtain a large discharge capacity per weight.

Figure 3:
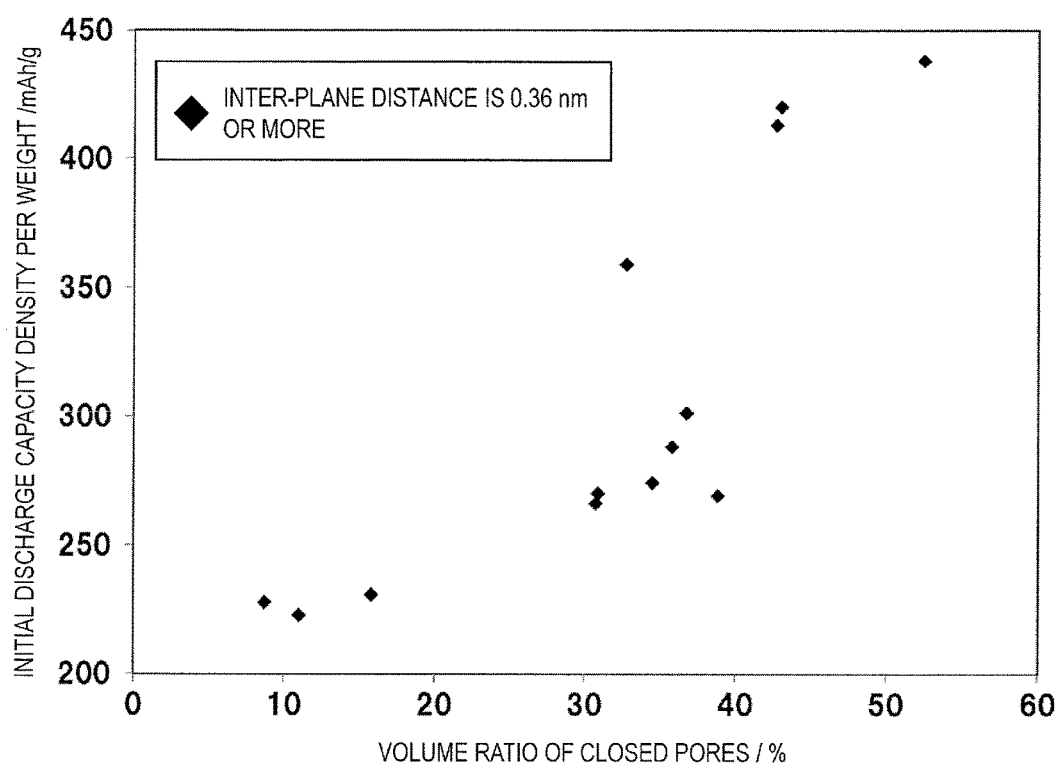
FIG. 3 A graph showing a relationship between the initial discharge capacities of sodium-ion secondary batteries of Examples 1 to 10, Comparative Example 1, Comparative Example 7, and Comparative Example 11 and the closed pore ratio of the negative-electrode active material.

FIG. 3 shows a relationship between the initial discharge capacity in the charge-discharge test and the closed pore ratio of the negative-electrode active material, with respect to the evaluation cells of Examples 1 to 10 and Comparative Example 1, Comparative Example 7, Comparative Example 11, in which the solid portion has a distance between (002) planes of 0.36 nm or more. In all of the negative-electrode active materials of Examples 1 to 10, the closed pores account for a volume ratio of 30% or more, and the distance between (002) planes of the solid portion is 0.36 nm or more. Moreover, they exhibit an initial discharge capacity per unit weight of 265 mAh/g or more. It is learned from these results that, when the distance between (002) planes is 0.36 nm or more and the closed pores account for a volume ratio of 30% or more, it is possible to achieve a greater capacity than the maximum capacity per unit weight of any sodium-ion battery in which a conventional amorphous carbon material in glass form is used as the negative-electrode active material.

In the negative-electrode active materials of Comparative Example 1, Comparative Example 7, and Comparative Example 11, the distance between (002) planes of the solid portion is as large as 0.379 nm, 0.373 nm, and 0.369 nm; thus, a sodium pathway is secured, but the ratio of the closed pores to serve as sites of sodium occlusion is as small as 11%, 15.8%, and 8.7%. This is the presumable reason why the initial discharge capacity is as small as 223 mAh/g, 231 mAh/g, and 228 mAh/g.

In the negative-electrode active materials of Comparative Example 2, Comparative Example 3, and Comparative Example 9, the closed pore ratio is as large as 36.2%, 34.1%, and 37.8%, but the distance between (002) planes of the solid portion is somewhat smaller, i.e., 0.354 nm, 0.350 nm, and 0.352 nm. Therefore, although there are sufficient closed pores to serve as sites of sodium occlusion, an adequate sodium pathway cannot be secured, thus resulting in somewhat small initial discharge capacity values of 237 mAh/g, 230 mAh/g, and 243 mAh/g. In the negative-electrode active material of Comparative Example 10, the distance between (002) planes of the solid portion is as large as 0.383 nm, and thus a sodium pathway is secured; however, the ratio of closed pores to serve as sites of sodium occlusion is very small, i.e., 4.5%. This is the presumable reason for the very small initial discharge capacity of 62 mAh/g. In the negative-electrode active material of Comparative Example 4, the closed pore ratio is as small as 14.7%, and the distance between (002) planes of the solid portion is as small as 0.354 nm. That is, an adequate sodium pathway is not secured, and there are not sufficient closed pores to serve as sites of sodium occlusion. This is the presumable reason for the small initial discharge capacity value of 74 mAh/g.

In the negative-electrode active materials of Examples 1 to 3 and Examples 5 to 10, the open pore ratio is 30% or more, the distance between (002) planes of the solid portion is 0.36 nm or more, and the open pore ratio is 6.1% or less. This is the presumable reason for the initial charge-discharge efficiency of 90% or more, which is a high initial charge-discharge efficiency relative to the initial charge-discharge efficiency of Comparative Example 1.

In the negative-electrode active materials of Examples 1 to 3 and Examples 6 to 10, the open pore ratio is 30% or more, the distance between (002) planes of the solid portion is 0.36 nm or more, and the closed pore ratio is 2.6% or less. This is the presumable reason for the high initial charge-discharge efficiency of 92% or more. This incipient charge-discharge efficiency value is a very high value, which is on a similar level to that provided by a graphite negative electrode of a lithium-ion secondary battery.

In the negative-electrode active materials of Comparative Examples 1 to 4 and Comparative Example 9, the open pore ratio is a relatively small value, i.e., 4.1% or less, but either one or both of the closed pore ratio and the distance between (002) planes of the solid portion has an insufficient value(s). This is the presumable reason for the lack of a sufficiently high value, as indicated by an initial charge-discharge efficiency of 90% or less. In Comparative Example 5, Comparative Example 6, Comparative Example 10, and Comparative Example 12, in which the open pore ratio is extremely large, i.e., 80.2%, 65.9%, 59.6%, and 89.6%, the initial charge-discharge efficiency is extremely low, i.e., 24% or less. It was confirmed from this that the initial charge-discharge efficiency lowers when the open pore ratio is large.

From the above results, it was confirmed that a porous carbon material having open pores that extend through to the surface, closed pores that do not extend through to the surface, and a solid portion, such that the porous carbon material contains a solid portion in which the distance between (002) planes of the solid portion is 0.36 nm or more and the closed pores account for a volume ratio of 30% or more, has a discharge capacity per weight of 265 mAh/g or more, which is large for a negative-electrode active material for a sodium-ion secondary battery. In addition, it was confirmed that a porous carbon material in which open pores account for a volume ratio of 7% or less exhibits an initial charge-discharge efficiency as high as 90% or more, and that a carbon material in which open pores account for a volume ratio of 3% or less has an initial charge-discharge efficiency as high as 92% or more, which is on a similar level to that provided by a graphite negative electrode of a lithium-ion secondary battery.

It is also indicative that a sodium-ion secondary battery in which such a negative-electrode active material with large discharge capacity per weight is used can provide a storage battery which has a large capacity per weight, i.e., light weighted.

The above embodiments illustrate negative-electrode active materials in which closed pores exist with a volume ratio of 52.5% at the most. However, it is preferable that the volume ratio of the closed pores is as large as possible; it is not intended that negative-electrode active materials with greater volume ratios of closed pores are excluded. A negative-electrode active material with a greater volume ratio of closed pores can be realized by appropriately selecting heat treatment conditions for closing the open pores, for example, and it is considered that the volume ratio of closed pores can be increased to about 90%, which is the largest possible volume ratio for open pores.

The above embodiments illustrate negative-electrode active materials which at least partially have open pores. However, it is preferable that the volume ratio of open pores is as small as possible; it is not intended that negative-electrode active materials having no open pores are excluded. It is considered that a negative-electrode active material having no open pores can be realized by appropriately selecting heat treatment conditions for closing the open pores, for example.

INDUSTRIAL APPLICABILITY

A sodium-ion secondary battery according to one implementation of the present invention can be suitably used for a power source of a mobile electronic device or the like; a power storage device for electric power leveling to be used in combination with power generation equipment for thermal power generation, aerogeneration, fuel cell generation, or the like; a power source of an emergency power storage system, a late-night power storage system, or the like for general households and collective housing; an uninterruptible power supply; and a power source of a transportation apparatus such as an electric vehicle, a hybrid vehicle, or a plug-in hybrid vehicle.

REFERENCE SIGNS LIST 10 negative-electrode active material
11 surface
12 open pore
13 closed pore
14 carbon portion
15 negative-electrode mixture layer
21 positive-electrode current collector
22 positive-electrode mixture layer
23 positive electrode
24 negative-electrode current collector
25 negative-electrode mixture layer
26 negative electrode
27 separator
28 sheath

The invention claimed is:

1. A negative-electrode active material for a sodium-ion secondary battery, comprising a porous carbon material having a plurality of open pores that extend through to a surface, a plurality of closed pores that do not extend through to the surface, and a solid portion made of carbon material, wherein,
a distance between (002) planes of carbon in at least a part of the solid portion is not less than 0.36 nm and not more than 0.41 nm; and
the plurality of closed pores account for a volume ratio of not less than 30% and not more than 90% with respect to a total volume of the plurality of open pores, the plurality of closed pores, and the solid portion.

2. The negative-electrode active material for a sodium-ion secondary battery of claim 1, wherein the plurality of open pores account for a volume ratio of 7% or less with respect to a total volume of the plurality of open pores, the plurality of closed pores, and the solid portion.

3. The negative-electrode active material for a sodium-ion secondary battery of claim 1, wherein the plurality of open pores account for a volume ratio of 3% or less with respect to a total volume of the plurality of open pores, the plurality of closed pores, and the solid portion.

4. A sodium-ion secondary battery comprising:
a negative electrode containing the negative-electrode active material of claim 1;
a positive electrode containing a positive-electrode active material capable of occlusion and release of sodium; and
an electrolyte containing sodium ions.

5. A method of producing a negative-electrode active substance for a sodium-ion secondary battery, comprising:
a step of providing an organic material to serve as a carbon source; and
a step of subjecting the organic material to a heat treatment in an inert atmosphere to obtain a porous carbon material, wherein,
the organic material is a cellulose-type resin;
the porous carbon material has a plurality of open pores that extend through to a surface, a plurality of closed pores that do not extend through to the surface, and a solid portion made of carbon material;
a distance between (002) planes of carbon in at least a part of the solid portion is not less than 0.36 nm and not more than 0.41 nm; and
the plurality of closed pores account for a volume ratio of not less than 30% and not more than 90% with respect to a total volume of the plurality of open pores, the plurality of closed pores, and the solid portion.

6. The method of producing a negative-electrode active material for a sodium-ion secondary battery of claim 5, wherein the heat treatment temperature is not less than 1400° C. and not more than 2000° C.

7. The method of producing the negative-electrode active material for a sodium-ion secondary battery of claim 5, wherein the organic material or carbon material having porosity is not subjected to a pulverization treatment after being subjected to the heat treatment.

8. The method of producing the negative-electrode active material for a sodium-ion secondary battery of claim 5, further comprising, before the step of subjecting the organic material to the heat treatment:
a step of carburizing the organic material to obtain a carbide; and
a step of pulverizing the carbide,
wherein,
in the step of subjecting the organic material to a heat treatment, the pulverized carbide is heat-treated.

9. A method of producing a negative-electrode active substance for a sodium-ion secondary battery, comprising:
a step of providing an organic material to serve as a carbon source;
a step of pulverizing the organic material in a mortar; and
a step of subjecting the pulverized organic material to a heat treatment in an inert atmosphere to obtain a porous carbon material, wherein,
the organic material is phenolphthalein;
the porous carbon material has a plurality of open pores that extend through to a surface, a plurality of closed pores that do not extend through to the surface, and a solid portion made of carbon material;
a distance between (002) planes of carbon in at least a part of the solid portion is not less than 0.36 nm and not more than 0.41 nm; and
the plurality of closed pores account for a volume ratio of not less than 30% and not more than 90% with respect to a total volume of the plurality of open pores, the plurality of closed pores, and the solid portion.

10. The method of producing the negative-electrode active material for a sodium-ion secondary battery of claim 9, further comprising, before the step of subjecting the organic material to the heat treatment and the step of pulverizing the organic material:
a step of carburizing the organic material to obtain a carbide,
wherein,
in the step of pulverizing the organic material, the carbide is pulverized; and
in the step of heat treatment, the pulverized carbide is heat-treated.

11. The method of producing a negative-electrode active material for a sodium-ion secondary battery of claim 9, wherein the heat treatment temperature is not less than 1400° C. and not more than 2000° C.

12. The method of producing the negative-electrode active material for a sodium-ion secondary battery of claim 9, wherein the organic material or carbon material having porosity is not subjected to a pulverization treatment after being subjected to the heat treatment.

13. A method of producing a negative-electrode active substance for a sodium-ion secondary battery, comprising:
- a step of providing a carbon material having porosity; and
- a step of subjecting the carbon material having porosity to a heat treatment in an inert atmosphere to obtain a porous carbon material, wherein,
- the carbon material having porosity is an activated carbon material;
- the porous carbon material has a plurality of open pores that extend through to a surface, a plurality of closed pores that do not extend through to the surface, and a solid portion made of carbon material;
- a distance between (002) planes of carbon in at least a part of the solid portion is not less than 0.36 nm and not more than 0.41 nm; and
- the plurality of closed pores account for a volume ratio of not less than 30% and not more than 90% with respect to a total volume of the plurality of open pores, the plurality of closed pores, and the solid portion.

14. The method of producing a negative-electrode active material for a sodium-ion secondary battery of claim 13, wherein the heat treatment temperature is not less than 1900° C. and not more than 2300° C.

15. The method of producing the negative-electrode active material for a sodium-ion secondary battery of claim 13, wherein the organic material or carbon material having porosity is not subjected to a pulverization treatment after being subjected to the heat treatment.

16. A method of producing a negative-electrode active substance for a sodium-ion secondary battery, comprising:
- a step of providing a carbon material having porosity; and
- a step of subjecting the carbon material having porosity to a heat treatment in an inert atmosphere to obtain a porous carbon material, wherein,
- the carbon material having porosity is a template carbon material;
- the porous carbon material has a plurality of open pores that extend through to a surface, a plurality of closed pores that do not extend through to the surface, and a solid portion made of carbon material;
- a distance between (002) planes of carbon in at least a part of the solid portion is not less than 0.36 nm and not more than 0.41 nm; and
- the plurality of closed pores account for a volume ratio of not less than 30% and not more than 90% with respect to a total volume of the plurality of open pores, the plurality of closed pores, and the solid portion.

17. The method of producing the negative-electrode active substance for a sodium-ion secondary battery of claim 16, wherein the step of providing the carbon material having porosity generates the template carbon material from an organic acid metal as a start material.

18. The method of producing a negative-electrode active material for a sodium-ion secondary battery of claim 17, wherein the organic acid metal is organic acid magnesium.

19. The method of producing the negative-electrode active substance for a sodium-ion secondary battery of claim 16, wherein the step of providing the carbon material having porosity comprises:
- a step of baking an organic acid metal in an inert atmosphere at a temperature of not less than 600° C. and not more than 900° C. to obtain a bake; and
- a step of cleaning the bake with an acid to remove from the bake a metal composing the organic acid metal or a compound containing the metal.

20. The method of producing the negative-electrode active material for a sodium-ion secondary battery of claim 16, wherein the heat treatment temperature is 1900° C. or above.

21. The method of producing the negative-electrode active material for a sodium-ion secondary battery of claim 16, wherein the organic material or carbon material having porosity is not subjected to a pulverization treatment after being subjected to the heat treatment.

* * * * *